April 26, 1927.
H. S. WALKER
1,626,570
ELECTRICAL WIRING SYSTEM
Filed May 15, 1926        2 Sheets-Sheet 1
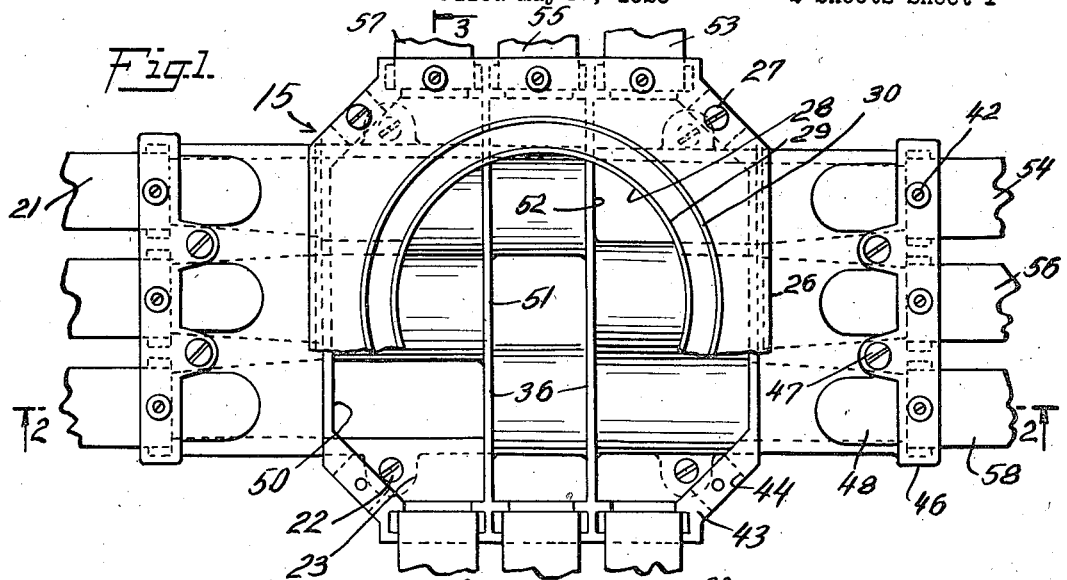
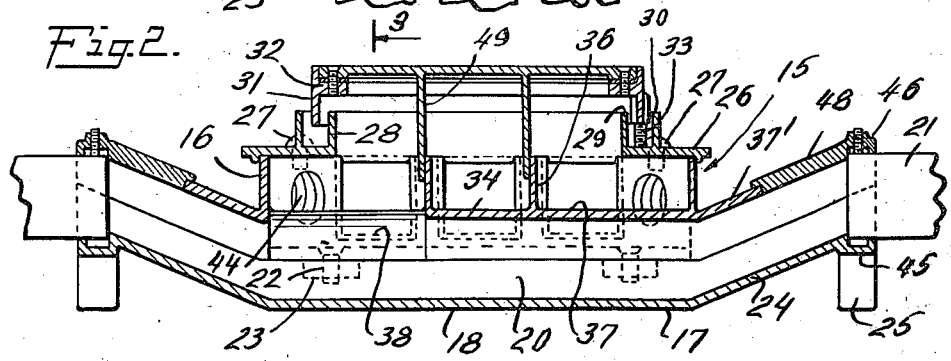
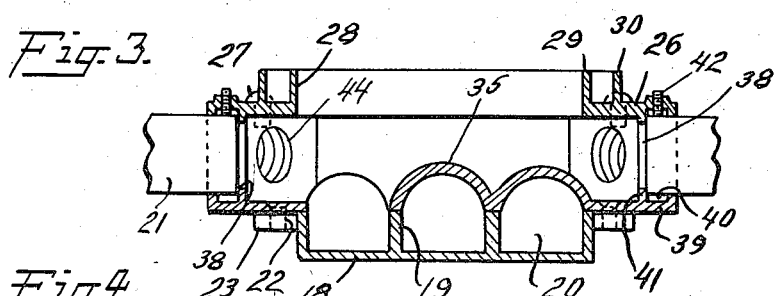
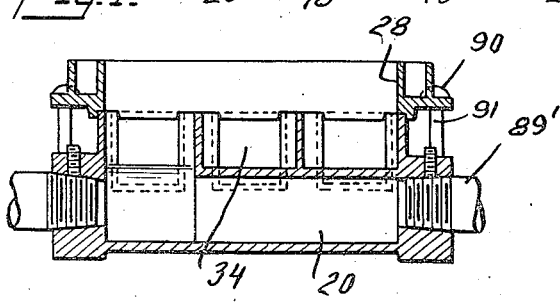

April 26, 1927.  1,626,570
H. S. WALKER
ELECTRICAL WIRING SYSTEM
Filed May 15, 1926   2 Sheets-Sheet 2
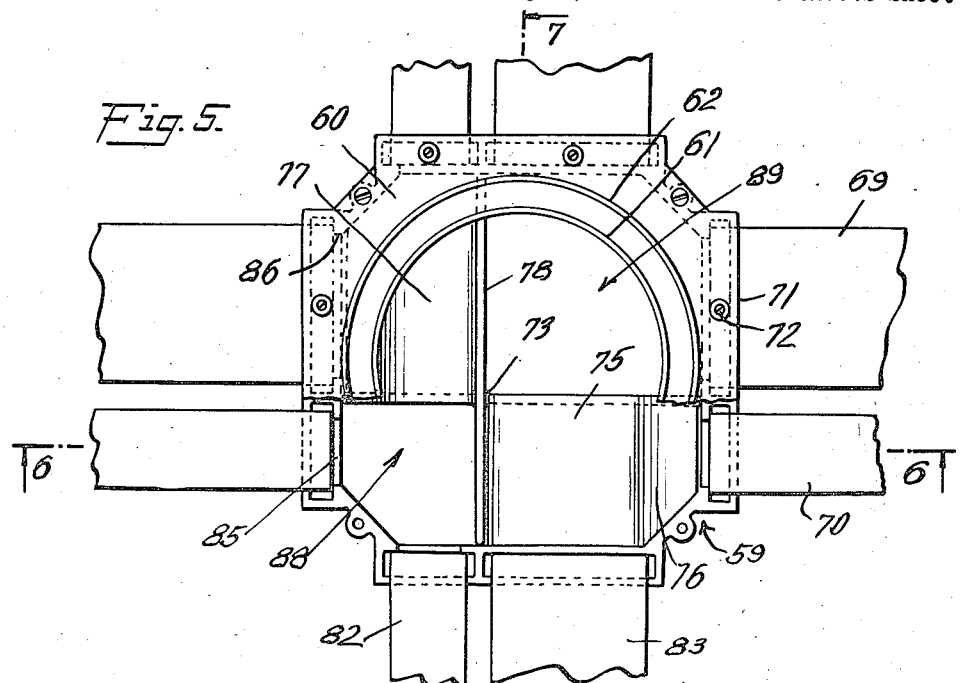

Patented Apr. 26, 1927.

1,626,570

UNITED STATES PATENT OFFICE.

HERVEY S. WALKER, OF ARDMORE, PENNSYLVANIA.

ELECTRICAL WIRING SYSTEM.

Application filed May 15, 1926. Serial No. 109,248.

This invention relates to electrical wiring systems of the concealed type, such as are now commonly installed in office and other similar buildings, and has to do more particularly with a system which may be installed in a relatively shallow space owing to the use of improved junction and cross-over boxes with which the conduits or ducts of the system communicate.

In modern office buildings, somewhat elaborate wiring systems are required, since electrical current of different kinds for different services must be supplied to all parts of the floors. As concealment of the system is desirable, the standard practice is to install the system in the floors prior to their completion, and there is accordingly built into the floor structure, a system of main and branch conduits or ducts with the necessary floor boxes, and the conduits are so arranged that some part of the system at which an outlet for conductors may be made is available at every part of the floor.

The usual floor in a building of present steel and concrete construction includes a rough concrete floor slab, over which is laid a layer of cinder concrete fill covered by a relatively thin layer of cement mortar forming the finished floor surface. The wiring system of conduits and boxes is laid on the top of the rough floor slab and is wholly enclosed and concealed within the fill, except for the boxes which have necks extending upwardly and closed by covers which lie flush with the level of the finished floor. Frequently, the floor is to be covered with linoleum or other similar tread material and, in this event, the boxes will be arranged so that the covers are exposed through and lie flush with the linoleum. The conduits, however, are almost always within the fill and except under special conditions do not project into the finishing layer, since this would lessen the thickness of the layer and might result in collapse or cracking if heavy bodies were moved over the floor.

As the ordinary wiring system consists of conduits extending through the floor in two directions with the branch conduits extending at right angles, for example, to the main conduits, provision must be made for the crossing of the conductors and it has been common practice heretofore to lay the conduits in two different levels and to make use of boxes having channels with which the conduits communicate, also at different levels. This arrangement, however, is open to objection in that the system requires a comparatively deep space for installation and, as the available space is limited by the top of the rough floor slab and the bottom of the finishing layer, it is sometimes necessary in the installation of a system of this kind to cut into the top of the slab to provide depressions in which the boxes may be placed. This entails additional labor charges and is generally unsatisfactory.

Attempts have also been made to overcome the difficulty by laying all the conduits on one level on the top of the slab, and using boxes which have transverse channels, one above another, with the bottom of the boxes extending into depressions cut into the slab. This arrangement permits the use of a thinner layer of fill in the construction of the floor but requires the cutting of relatively deep depressions in the slab and this is objectionable in that the slab is weakened and the cost of installation is increased.

The present invention is directed to the provision of a wiring system which overcomes the difficulties above pointed out, and the improved system is capable of being installed in a relatively shallow space in the floor, without necessitating cutting into the floor slab, or installing the conduits or ducts so that they enter the finishing layer of the floor. In the new system, the conduits for the main and branch circuits lie in the same plane and at the points where these conduits intersect, are boxes which permit the conductors in the different conduits to be kept separate in passing through the boxes. Although the latter have a less overall height than is usually the case with boxes of the same type, at the same time the total height of the boxes from base to cover is not greater than the ordinary minimum distance between the top of the rough slab and the top of the finished floor surface.

The desired result is obtained by making use of a box which is of less height than those heretofore employed, but which is so constructed that this reduction in height does not bring about a substantial reduction in capacity. Within this box are channels through which pass the conductors extending between conduits in end-to-end alignment, and these channels are disposed in different levels and separated by a horizontal partition, with the channels of each level defined in part by separating partitions which prevent contact between conductors extending in the same direction but carrying current at different voltages. Those channels which are in the lower level may be of substantially the same height as the conduits which are connected to them, but may be of increased cross-sectional area due to the enlarged horizontal dimensions of the box which exceed the combined horizontal dimensions of the conduits leading to the channels in this level. The horizontal partition defining the tops of the channels of the lower level and the bottoms of the channels of the upper level may lie somewhat above the lower level of the openings which lead to the upper channel, but reduction in size of the upper channels is avoided by making these channels open to the neck with which such boxes are normally provided and which extends upward from the body of the box. For this purpose, partition members are used which subdivide the space within the neck, thus keeping separated the conductors for currents of different tensions which lie in the upper channels. The vertical partitions which subdivide the neck are preferably formed in part by partition members within the body of the box and in part by depending flanges on the cover itself, the flanges and the partition members co-operating to define the upper channels and preferably overlapping to some extent so that adjustment of the cover may be had without causing openings in the side wall of the channels.

With this arrangement the channels of the upper level have a cross-sectional area which is not substantially less than the cross-sectional area of the conduits connected thereto, and in some instances may be as great as this area or greater. Also, although the height of the box body is less than the combined height of a pair of conduits, one of each level, this result is obtained without reducing the cross-sectional area of the channels within the box to a substantial extent and without exposing the wires carrying currents of different tensions to each other.

In one form, the new box may have openings in two opposite side walls communicating with the upper channels and hollow extensions or necks leading upward at an angle from the other two sides and having openings at their ends in the same plane as the openings in the box walls; or if desired, the openings leading to the channels may all be in the box walls but the lower channels may slope downward at their opposite ends toward the bottom of the box to pass beneath the upper channels. The latter arrangement of the channels requires making the box of somewhat greater horizontal dimensions than are necessary in the first type but ordinarily the horizontal space in the floor structure is not restricted so that variation in the box dimensions in the plane of the floor is unimportant. Other forms of the box embodying the same features of construction may also be used and, in all of these forms, access may be had from an upper channel to a lower by providing apertures in the partition which forms the top of the lower channels. The channels so communicating will of course contain conductors carrying current of the same tension.

For a better understanding of the invention, reference may be had to the accompanying drawings, in which—

Fig. 1 is a top plan view partly in section of one form of the new box,

Fig. 2 is a vertical sectional view on the line 2—2 of Fig. 1,

Fig. 3 is a vertical sectional view on the line 3—3 of Fig. 1,

Fig. 4 is a vertical sectional view of a modified form of the box,

Fig. 5 is a view similar to Fig. 1 of another modification,

Fig. 6 and Fig. 7 are vertical sectional views on the lines 6—6 and 7—7, respectively, of Fig. 5, and Fig. 8 is a vertical sectional view through a portion of a floor showing the system installed.

The new system is illustrated in Fig. 8 installed in a floor structure, the floor consisting of the rough floor slab 10 on top of which is the cinder fill 11, covered by the finished floor surface layer 12. In the space between the bottom face of the layer 12 and the upper face of the floor slab 10, is installed the wiring system comprising a network of conduits or ducts 13 extending in different directions.

These conduits contain main and branch circuit conductors and a typical layout may include main circuit conduits extending along the axis of the room, with branch circuit conduits lying transverse thereto. At the points where the conduits intersect are boxes 14 which have openings in their opposite sides. The conduits are connected to the boxes at the openings and within the boxes are channels extending between openings in opposite side walls and providing passageways for the conductors. Usually the use to which the floor space is to be put requires that current at different tensions be supplied, and accordingly the main and branch circuit conduits are laid in pairs or groups of three, and individual channels are provided in the boxes so that the conductors carrying current of different tensions may be kept separate. The boxes may be of the cross-over type which permit the crossing of conductors of different circuits; or the boxes may be of the junction and cross-over type, which provide for communication between channels for conductors of the different circuits, in which channels are conductors carrying current at the same tension.

In the installation of wiring systems heretofore it has been customary either to install the conduits of the different circuits in different levels, making use of boxes having channels in these levels, or else to lay the conduits all in the same level, as, for example, on the top of the rough floor slab, and then provide for the crossing over of the conductors by employing boxes which have channels at different levels but with the channels of one level lying beneath the top of the slab. The use of such boxes necessitates cutting into the top of the slab, and this increases the labor cost of the installation and in some instances may weaken the slab to an undesirable extent.

In the present system the conduits of the two circuits are placed in the same level but carried by suitable supports a short distance above the top of the rough floor slab. Boxes are used which have openings for the conduits of the different circuits all in the same level, but the channels which connect the openings and extend transverse to each other are arranged in two levels. The boxes, however, are so constructed that the total height from the bottom of the lower channels to the top of the upper channels is less than the combined height of the openings to the two channels, and with this arrangement the height of the box may be kept within the required limits.

Boxes constructed to secure the desired result are shown in different modifications in the drawings, and the box shown in Fig. 1 consists of a body 15 made in upper and lower sections 16 and 17 respectively. This box is made of metal, preferably of cast iron, and the lower section has a flat bottom 18 having upstanding walls 19 forming transverse channels 20. The box illustrated is intended to be used in a system in which the ducts 21 are arranged in groups of three, the ducts being of square cross-section. There are accordingly three transverse channels 20 in the lower level, as shown in Fig. 3. The upper section is secured to the lower section by screws 22 entering lugs 23 formed integrally with the lower section, and at either end the lower section has extensions 24 which are inclined upwardly and provided at their outer ends with supporting lugs 25, the lower ends of which lie in the same plane as the bottom of the lower section. The extensions are subdivided into individual channels similar to the channels 20.

The upper section 16 of the box consists of a body portion provided with a cover 26 held in position by screws 27. The cover has a central opening 28 surrounded by spaced upstanding flanges 29 and 30, in which is received the flange 31 of a cover 32. The latter is to lie flush with the floor and the flange 31 carries adjustment screws 33 which enter suitable recesses between the flanges 29 and 30 and may be set so as to raise or lower the cover to the desired extent.

At the lower end the upper section has a bottom plate 34 having arched portions 35 cooperating with the upstanding walls 19 to provide for the passages 20. Extending across the arched portions 35 are walls 36 dividing the space in the upper section into channels 37 extending transverse to channels 20. The upper section also has extensions 37′ which cooperate with the extensions 24 to form hollow necks which serve as the inclined ends of channels 20.

In one pair of opposite side walls of the upper section are openings 38 communicating with the channels 37, and of a size dependent on the size of the ducts to be used with the box. At each opening is a projecting collar 39 within which is a recess 40. The end of the duct 30 enters the collar 39 and abuts against a stop collar or shoulder 41. Prior to the insertion of the end of the duct, oakum or other packing material is placed in the recess 40 and the duct is held by means of a set screw 42. The corners of the upper section of the box are cut off at an angle, providing short sides having threaded openings 44 in which may be screwed the ends of conduits which lead from the box at an angle to the ducts.

At the end of the extensions 24 are openings having collars 45 similar to collars 39 and the top of the openings is closed by a plate 46 held in place by screws 47 and having tongues 48 which close similarly shaped openings in the upper wall of the extensions. The plate 46 with the tongues may be removed as a unit, thus providing openings at the top of the extensions into which the ends of the ducts may be slipped, the plate then being screwed tightly against the ducts after the ends have been packed as described.

It will be noted that the arched tops 35 of the channels in the lower level lie above the lower edges of the openings 35 (Fig. 2) and accordingly while the channels in the lower level are of approximately the same vertical dimension as the ducts 21, the arrangement of these tops 35 to some extent restricts the vertical dimension of the channels of the upper level connecting the openings 38. The inner flange 29 at the central opening of the box provides a hollow neck to which the channels of the upper level are open, and accordingly, although the channels of the upper level are restricted by the presence of the arched tops 35, this is compensated for because of the presence of the open neck. There is therefore plenty of room in the channels of the two levels for the passage of the conductors, but at the same time the over-all distance from the bottom of the lower channels to the top of the openings to the upper channels is considerably less than the combined vertical dimensions of the openings to the channels of the two levels. The result is that the box may have a considerably less over-all height than would be required if the channels were placed at different levels with each set of channels of full size throughout.

The cover 32 is provided with integral flanges 49 which contact with the upstanding walls 36 and with these walls separate the channels of the upper level. The box illustrated in Fig. 1 is of the junction type and accordingly parts of the arched members 35 are removed to provide openings, such as 50, 51, 52, through which communication may be had from the channels of one level to the channels of the other. In drawing the conductors through the ducts, the conductors passing through ducts 53 and 54, which are open through the opening 52, will carry current of the same tension. Similarly, ducts 55 and 56 in communication through the opening 51, will contain conductors carrying current at the same tension, and this is true also of ducts 57 and 58 in communication through the opening 50. By removing the cover, therefore, the conductors in all the ducts are exposed, and the necessary splicing or other connections may readily be made.

It will be noted that in the box illustrated in Fig. 1, the ducts connected to the box are in communication with channels lying in different levels, although the ducts lie in the same level, and to permit this crossing, the channels of the lower level include the inclined portions through the extensions 24. The inclined portions of these channels lie in necks which project beyond the walls of the box, and although this arrangement is satisfactory from the standpoint of installation, owing to the fact that there is plenty of space in the floor in the horizontal direction, the requirements of the particular installation may make it undesirable to make use of a box in which such extensions are included. In such an installation the box shown in Figs. 5, 6, and 7 may be used. This box consists of a body 59 provided with a cover 60 having upstanding flanges 61 and 62, in which is received the flange 63 of the cover plate 64 mounted on adjustment screws 65. The cover 64 is to lie flush with the floor. The lower wall of the box has a flat bottom 66 having inclined side walls 67 and there are openings 68 in pairs in the opposite side walls of the box. The box illustrated is intended to be used with a two-duct system, one of the ducts 69 being of oblong cross-section, while the duct 70 is square. The two ducts are of the same height, but are of different widths. The openings 68 in the side walls of the box will accordingly have the appropriate shapes to receive the ends of the two different kinds of ducts. The top of the openings is closed by a flange 71 formed as a part of the cover 60 and set screws 72 are provided to secure the ends of the ducts in position, as previously described.

Within the box is a partition member 73 which may be a single casting mounted removably in the box. This casting has a central vertical wall 74 which rests at the bottom against the upper surface of the bottom plate 66. Extending to one side from the top of the central wall is a plate 75 having an inclined portion 76 which terminates at its end against the lower face of the cover 60. A similar plate 77, with an inclined portion at its end, extends to the other side of the central wall, and extending at right angles to the supporting wall 74 is another vertical wall 78 which at its top lies flush with the upper edge of the body 67. A web 79 from the cover 64 contacts with the wall 78 along one side.

The conduits 69 and 70 are in communication with channels 80, extending between opposite side walls of the box and lying below the plates 75 and 77. These channels have downwardly inclined portions 81 at their ends and are defined by the bottom plate 66, the under surfaces of plates 75 and 77, and are separated by the vertical wall 74. The ducts 82 and 83 extending transversely to the ducts 69 and 70 are connected to openings 85 and 86 lying in the same level as the openings to which ducts 69 and 70 are connected, but the ducts 82 and 83 communicate with channels lying at an upper level, and the conductors from ducts 82 and 83 are led through the box above plates 75 and 77 to the ducts connected to the opposite wall of the box and corresponding in shape and size to ducts 82 and 83. It will thus be noted that although the ducts of the two circuits all lie in the same plane, the conductors passing through the box are led through channels in different levels.

The top 87 of wall 74 lies a considerable distance above the plane of the lower edges of openings 85 and 86 and the plate 75 slopes downwardly from the edge 87 toward the outer wall of the box, at its end lying a slight distance below the edges of the openings with which ducts 82 and 83 communicate. The plate 77 has a similar slope, and it will be noted accordingly that the channels of the upper level are restricted by the upward inclination of the plates 75 and 77 to a point beyond the lower level of the openings through which the channels are in communication with the ducts. This restriction of the channels of the upper level is unimportant, because the channels are open at the top to the neck defined by the inner flange 61, this neck being subdivided into separate channels by the depending flange 79.

Accordingly, with this box the ducts may all be in the same level, and the channels for the conductors may be arranged at different levels, but the total distance from the bottom plate 66 to the top of the openings 85, 86, is less than the combined vertical heights of ducts 69 and 72, for example. At the same time the channels through the box provide sufficient space for the passage of the conductors.

This box and the box shown in Fig. 1 involve the same principles of construction, but in the box illustrated in Fig. 1, the downwardly inclined portions of the lower channels are formed in extensions or necks which lie beyond the walls of the box, while in the box shown in Fig. 5, the inclined portions of the lower channels are within the box walls. The box shown in Fig. 5 will ordinarily be of somewhat larger size than a box used for the same purpose and constructed in accordance with the showing of Fig. 1, although the latter box will have a greater dimension in one direction on account of the necks. Both boxes, however, permit the system to be installed in a relatively shallow space in the floor, without necessitating that the floor slab be cut to provide depressions for the boxes. The ducts lie a short distance above the surface of the slab, but may be conveniently mounted by the use of metal supports. As all the ducts of the system lie at the same distance above the slab, the same type of supports may be used throughout the installation.

The box shown in Fig. 5 is of the junction type and accordingly the plates 75 and 77 extending from either side of the central wall 74 are provided with openings 88 and 89 through which access may be had from the channels of one level to the channels of the other. The large ducts 69 and 83 will contain conductors carrying current of the same tension, and accordingly the conductors in duct 83, passing over the plate 75, may be exposed to the conductors in the duct 69, passing beneath the plate 77. The conductors in ducts 82 and 70 may similarly be exposed to each other without difficulty and by removing the cover of the box, access may be had to the channels of both levels to make the necessary splices and connections.

The boxes shown in Figs. 1 and 5 are intended to be used in a system in which the ducts all lie in the same level, this system to be installed in a floor where space must be conserved. Occasionally it may be desirable to install the conduits for the different circuits in different levels, in which instance a box such as that shown in Fig. 4 may be employed. This box is to be used with round conduits 89 which are connected to channels 20 of the lower level, while square ducts are connected to channels 34 of the upper level. The box is in other details of construction quite similar to that shown in Fig. 1, except that the cover 90 is connected by stay bolts 91 to the bottom section. The channels 20 of the lower level are defined by arched partition members similar to the members 35, and the tops of the channels of the lower level lie above the bottom of the channels of the upper level. The channels of the upper level are open to the neck 28, as is the case in the box illustrated in Fig. 1. The box shown in Fig. 4 permits the installation of conduits 89' in a level lower than that in which lie the ducts connected to channels 34, but at the same time, the over-all distance from the bottom of the channels 20 to the top of the channels 34 is less than the combined heights of these two channels. The box therefore affords a considerable saving in height and in its interior construction corresponds closely to the boxes previously described.

It will be seen, therefore, that the new system may be installed in a relatively shallow space in the floor and that this installation may be accomplished without cutting into the floor slab for the boxes or disposing certain of the ducts at such a height that the tops of the ducts enter the finishing floor layer. The ducts may be placed all in a single plane, or may lie in different planes, but the boxes are of considerably less height than the boxes heretofore used. These boxes may be either of the junction type, as illustrated, or may be simply for cross-over purposes, in which form no means of access between channels of different levels is provided for.

This application is a continuation in part of my application, Ser. No. 63,355, filed Oct. 19, 1925, which was copending herewith and has now matured into Patent No. 1,592,548.

I claim:

1. A concealed wiring system for installation in the floor of a concrete building, comprising a network of ducts extending in different directions and lying within the floor at substantially the same level, boxes at the intersections of the ducts, each box having a body with openings for entrance of respective ducts and a neck opening substantially to the finished surface of the floor, and means including a cover for the neck and portions within the box body and neck forming transverse enclosed channels between the respective duct entrances whereby the channels have a cross-section substantially as great as the respective ducts and the over-all height of the box body is substantially less than twice the height of a single duct.

2. A concealed wiring system for installation in the floor of a concrete building which floor includes a floor slab, a filling layer thereover, and a finishing layer, comprising a network of ducts extending in different directions and lying within the filling layer at substantially the same level, boxes at the intersections of the ducts, each box resting on the floor slab and having a body lying substantially within the filling layer provided with openings for entrance of respective ducts and a neck opening through the finishing layer to the surface of the floor, and means including a cover for the neck and members within the box body and neck forming transverse enclosed channels between the respective duct entrances whereby the channels have a cross-section substantially as great as the respective ducts and the overall height of the box body is substantially less than twice the height of a single duct.

3. A concealed wiring system for installation in the floor of a concrete building, comprising a network of ducts extending in different directions within the floor and lying at substantially the same level, and boxes at the intersection of the ducts, each box having a body provided with openings for entrance of respective ducts, and a neck opening substantially to the finished surface of the floor, a cover for the neck, and partition members within the box body and neck cooperating with the cover to form transverse enclosed channels between the respective duct entrances, whereby the channels have a cross-section substantially as great as their respective ducts and the over-all height of the box body is substantially less than twice the height of a single duct.

4. A concealed wiring system for installation in the floor of a concrete building comprising a network of ducts extending in different directions and lying within the floor at substantially the same level, and boxes at the intersection of the ducts, each box having a body provided with openings for entrance of respective ducts and a neck opening substantially to the finished surface of the floor, a cover for the neck, and partition means within the box body and neck cooperating with the cover to form transverse enclosed channels between the respective duct entrances, these channels having portions at different levels, parts of the channels of the upper level utilizing space within the neck, whereby the channels have a cross-section substantially as great as their respective ducts and the over-all height of the box body is substantially less than twice the height of a single duct.

5. A concealed wiring system for installation in the floor of a concrete building, comprising a network of ducts extending in different directions and lying within the floor at substantially the same level, boxes at the intersections of the ducts, each box having a body provided with openings for entrance of respective ducts and a neck opening substantially to the finsihed surface of the floor, a cover for the neck, and partition means within the box body and neck cooperating with the cover to form transverse superposed enclosed channels between the respective duct entrances, the said partition means lying within the box body and neck whereby the channels have a cross-section substantially as great as the respective ducts and the overall height of the box body is substantially less than twice the height of a single duct, certain of the channels of the upper level being connected with channels beneath them through openings defined by the partition means.

6. A box for use in a wiring system consisting of a network of ducts intersecting at various points, which comprises a body having openings for entrance of respective ducts and a neck extending upwardly therefrom, a cover for the neck, and partition means within the body and neck cooperating with the cover to form transverse enclosed channels between the respective duct entrances, whereby the channels have a cross-section substantially as great as the respective ducts and the overall height of the box body is substantially less than twice the height of a single duct.

7. A box for use in a wiring system consisting of a network of ducts intersecting at various points, which comprises a body provided at its top with a neck having a cover, partition means within the body and neck defining transverse enclosed channels at two different levels having openings through the wall of the body for entrance of respective ducts, these channels having portions within the box at upper and lower levels, with the channels of the upper level open to the neck and defined in part by the partition means within the neck and in part by the cover, whereby the channels have a cross-section substantially as great as the respective ducts and the over-all height of the box body is substantially less than twice the height of a single duct.

8. A box for use in a wiring system consisting of a network of ducts intersecting at various points, which comprises a body having a neck provided with a cover, partition members within the body and neck defining transverse, enclosed channels at two different levels leading to openings in the body for the entrance of the ducts, one of these partition members forming the top of the channels of the lower level and lying above the level of the lower edges of the openings to the channels of the upper level, the channels of said upper level being open to the neck and in part defined by the partition members within said neck and by said cover, whereby the channels have a cross-section substantially as great as the respective ducts and the over-all height of the box body is substantially less than twice the height of a single duct, certain of the channels of the upper level being connected through openings in the partition members with channels of the lower level.

9. A box for use in a wiring system consisting of a network of ducts intersecting at various points, which comprises a body having a neck provided at its top with a cover, partition means separating the box into upper and lower portions and vertical partition members subdividing these portions into transverse channels leading to openings in the wall of the body for entrance of the respective ducts, the channels in the upper portion of the body in part utilizing space within the neck with the vertical partition members extending through the neck to the cover and separating the portions of the channels lying therein, whereby the over-all height of the body is less than twice the height of a single duct while the channels are of a cross-section substantially as great as the cross-section of the respective ducts.

10. A box for use in a wiring system consisting of a network of ducts intersecting at various points, which comprises a body provided with duct entrances and a neck, a cover for the neck, partition means within the body and neck cooperating with the cover to define superposed, enclosed channels extending transversely to each other between the respective duct entrances, the channels of the upper level being open to the neck and separated by portions of the said partition means extending substantially to the under side of the cover, whereby the channels have a cross-section substantially as great as the cross-section of the respective ducts and the over-all height of the box body is substantially less than twice the height of a single duct, said neck and partitions including means for adjusting the vertical position of the cover with respect to the body, whereby as the cover is raised and lowered, the channels of the upper level are maintained separated at all times.

11. A box for use in a wiring system consisting of a network of ducts intersecting at various points, which comprises a body having a neck provided with a cover, partition members within the body defining superposed channels extending across the body in transverse directions to openings in the side walls of the body for entrance of the respective ducts, the channels of the upper level in part utilizing space within the neck and being separated in part by a vertical partition member mounted within the body, and a partition member on the cover cooperating with the said vertical partition member to separate the portions of the upper channels which occupy the neck, whereby the channels are of substantially as great a cross-section as the respective ducts and the over-all height of the body is less than twice the height of a single duct.

12. A box for use in a wiring system consisting of a network of ducts intersecting at various points, which comprises a body having a neck provided with a cover, partition members within the body defining superposed channels extending across the body in transverse directions and leading to openings in the side wall of the body for entrance of the respective ducts, the channels of the upper level being accessible through the neck, a vertical partition member mounted within the body and partly separating the channels of the upper level, and a flange on the cover cooperating with the said vertical partition member to subdivide the neck into portions in communication with the channels of the upper level, the flange and the partition member having a partially overlapping relation, whereby the cover may be placed in different positions of vertical adjustment with relation to the body while the flange and vertical partition member cooperate throughout such adjustment.

13. A box for use in a wiring system consisting of a network of ducts intersecting at various points, which comprises a body having an upwardly projecting portion provided with a cover and openings in its side wall at one level for entrance of ducts, partition walls defining channels connecting opposite openings and extending transverse to each other, these channels having portions lying in different levels with the channels of the upper level accessible through the upwardly projecting portion, one of the said partition walls forming the top of a channel extending in one direction and the bottom of a channel extending in the other, this wall having portions which lie above the level of the bottom edges of the openings, and another wall extending into the upwardly projecting portion to the cover to separate the channels of the upper level, whereby the channels have a cross-section approximately as great as the cross-section of their respective ducts, while the height of the box body is substantially less than twice the height of a single duct.

14. A box for use in a wiring system consisting of a network of ducts intersecting at various points, which comprises a body terminating in an upwardly extending neck provided with a cover and having openings in its side walls for the entrance of ducts, partition means within the body and neck for defining transverse enclosed channels having portions at different levels, the channels of the upper level being accessible through the neck opening, and the partition members in the neck subdividing the space therein up to the cover, this space thus forming part of the channels of the upper level, whereby the channels have a cross-section approximately equal to the cross-section of their respective ducts and the height of the box body is substantially less than twice the height of a single duct, the partition means within the box being provided with openings affording access between certain of the channels of the two levels.

15. A box for use in a wiring system consisting of a network of ducts intersecting at various points, which comprises a body having an upwardly projecting neck provided with a cover, this body having openings for entrance of respective ducts, partition walls within the body defining separated channels extending across each other, one of the walls forming the bottom of a channel extending in one direction and the top of a channel extending in another direction, one of the channels having portions which lie off-set from the lower level of the entrance openings thereto with inclined portions leading from the entrance openings to the said offset portions, the channels of the upper level being accessible through the neck opening with the space in the neck subdivided by partition means whereby the space in the neck forms part of the channels, the channels thus having a cross-section substantially as great as the respective ducts and the over-all height of the box body being substantially less than twice the height of a single duct.

16. A box for use in a wiring system consisting of a network of ducts intersecting at various points, which comprises a body having a flat bottom portion with openings in the side wall of the body for the entrance of respective ducts, a neck projecting upwardly from the body and provided with a cover, and partition means within the body cooperating with the cover to define transverse enclosed channels connecting entrance openings in the opposite walls of the box body, these channels having portions lying in two different levels the partition means extending to the cover to separate the portions of the channels lying within the neck, whereby the channels have a cross-section approximately as large as the cross-section of their respective ducts and the over-all height of the box body is less than twice the height of a single duct.

17. A box for use in a wiring system consisting of a net-work of main and branch circuit conduits intersecting at various points, which comprises a body having an upwardly projecting portion provided with a cover, and partition walls within the box defining separated channels extending across each other, one of these walls forming the bottom of a channel extending in one direction and the top of a channel extending in another direction, the channels leading to openings in the side wall of the box and one channel having portions which lie offset from the lower level of the entrance openings thereto with inclined portions leading from the offset portions to the said openings, and the upper channel being open to the upwardly projecting portion of the box.

18. A duct connecting box for use in an electrical wiring system comprising a body having a flat bottom and an opening in its top wall defined by an upwardly extending neck, a removable cover for the said opening, a partition wall within the box defining a pair of channels extending across the box in one direction and leading to openings in the side walls thereof, these channels being accessible to the neck and the partition wall extending to the under surface of the cover, and another partition wall within the box defining a channel extending transversely to the first channels, this channel being separated from the said channels and lying in a different level therefrom, with openings in the box wall lying substantially in the same plane affording access to the channels.

19. A duct connecting box structure comprising superposed box sections having tubular extensions from opposite sides thereof, a partition wall in the upper section defining a pair of channels therethrough leading to openings in the side walls of the box, and a partition wall in the lower section defining a pair of channels therethrough which are connected at their ends to the extensions, the said extensions being inclined and having open ends which lie substantially in the same plane as the openings in the side wall of the box, the channels in the box lying in different planes.

20. A duct connecting box structure comprising a pair of superposed box sections provided with partition walls forming channels which extend transversely, the upper section having openings in its side wall with which the channel in said section is in communication, and tubular extensions from the upper and lower sections which together form inclined passageways connected to the channel through the said lower section, the passageways having outlet openings lying substantially in the plane of the openings in the side wall of the box to the channel in the upper section thereof.

21. A box for use in a wiring system having intersecting ducts which comprises a body portion having an upwardly extending neck provided with a cover and openings in the wall of the body to which the ducts lead, and partition means within the body defining channels extending in at least two directions and at two different levels between the openings in the wall of the box, the channels of one level having inclined portions within the box to permit the crossing over of the channels, and the channels of the upper level being accessible to the neck, the partition means extending substantially to the cover, whereby the channels have a cross-section substantially as great as the respective ducts and the over-all height of the body is substantially less than twice the height of a single duct.

22. A duct connecting box comprising a body having openings for entrance of respective ducts and a portion extending upwardly above the level of the tops of said openings, this portion having an opening, a cover closing the opening in normal use, and partition means within the body and extending to the under surface of the cover for defining transverse enclosed channels between the respective duct entrances, certain of these channels having a width greater than that of the ducts which lead to them, and the channels of the upper level being in part defined by the cover, whereby the channels have a cross-sectional area substantially as great as the respective ducts and the overall height of the box body from the bottom thereof to the top level of the entrance openings for the ducts is substantially less than twice the height of a single duct.

In testimony whereof I affix my signature.

HERVEY S. WALKER.